US012081969B2

(12) United States Patent
Sureshlal et al.

(10) Patent No.: US 12,081,969 B2
(45) Date of Patent: Sep. 3, 2024

(54) DEVICE AGNOSTIC REMOTE eSIM PROVISIONING

(71) Applicant: MOTOROLA SOLUTIONS, INC., Chicago, IL (US)

(72) Inventors: Harsha Sureshlal, Naperville, IL (US); Kiran Kumar Krishna, Waukegan, IL (US); Jeevan Kishore Pattiam, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/021,851

(22) Filed: Sep. 15, 2020

(65) Prior Publication Data

US 2022/0086633 A1 Mar. 17, 2022

(51) Int. Cl.
| | |
|---|---|
| *H04W 12/06* | (2021.01) |
| *H04W 8/18* | (2009.01) |
| *H04W 12/0431* | (2021.01) |
| *H04W 12/069* | (2021.01) |

(52) U.S. Cl.
CPC ....... *H04W 12/0431* (2021.01); *H04W 8/183* (2013.01); *H04W 8/186* (2013.01); *H04W 12/069* (2021.01)

(58) Field of Classification Search
CPC ... H04W 12/00; H04W 12/069; H04W 12/08; H04W 12/0431; H04W 8/183; H04W 8/186
See application file for complete search history.

(56) References Cited

U.S. PATENT DOCUMENTS

| | | | |
|---|---|---|---|
| 9,357,378 B1* | 5/2016 | Delker | H04W 4/60 |
| 9,408,012 B2 | 8/2016 | Li et al. | |
| 10,021,558 B2 | 7/2018 | Lalwaney | |
| 10,237,256 B1* | 3/2019 | Pena | H04L 63/0853 |
| 2013/0157673 A1 | 6/2013 | Brusilovsky | |
| 2016/0099938 A1* | 4/2016 | Seo | H04L 63/0869 |
| | | | 713/169 |
| 2016/0269891 A1 | 9/2016 | Chen et al. | |
| 2016/0277051 A1 | 9/2016 | Yang | |
| 2018/0063668 A1 | 3/2018 | Li | |
| 2019/0260762 A1* | 8/2019 | Fynaardt | H04L 63/123 |
| 2019/0357046 A1* | 11/2019 | Park | H04W 8/205 |
| 2020/0177450 A1 | 6/2020 | Li | |
| 2020/0178070 A1* | 6/2020 | Yang | H04W 12/48 |

FOREIGN PATENT DOCUMENTS

| | | |
|---|---|---|
| JP | 2018512822 A | 5/2018 |
| KR | 20180028729 A | 3/2018 |

* cited by examiner

*Primary Examiner* — Jinsong Hu
*Assistant Examiner* — Farideh Madani
(74) *Attorney, Agent, or Firm* — Michael Best & Friedrich LLP

(57) ABSTRACT

Systems and methods for device agnostic remote eSIM provisioning. One example method includes detecting, with an electronic processor, a provisioning trigger event. The method includes, responsive to detecting the provisioning trigger event, transmitting, via a transceiver, a provisioning request to a mobile device management server, the provisioning request including a device identifier and an identifier for an integrated circuit card of the wireless communication device. The method includes receiving, from the mobile device management server, an activation code. The method includes transmitting, to the integrated circuit card, a provisioning command based on the activation code.

5 Claims, 3 Drawing Sheets

DEVICE AGNOSTIC REMOTE eSIM PROVISIONING

BACKGROUND OF THE INVENTION

Public safety agencies and other entities use wireless communications devices (for example, smart telephones) to facilitate communication between their personnel. Before such devices can securely access wireless networks, services, and applications, subscriber profiles must be loaded onto the devices. Carrier and subscriber profiles, which include authentication information for the wireless communications devices, are stored on embedded subscriber identity modules.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
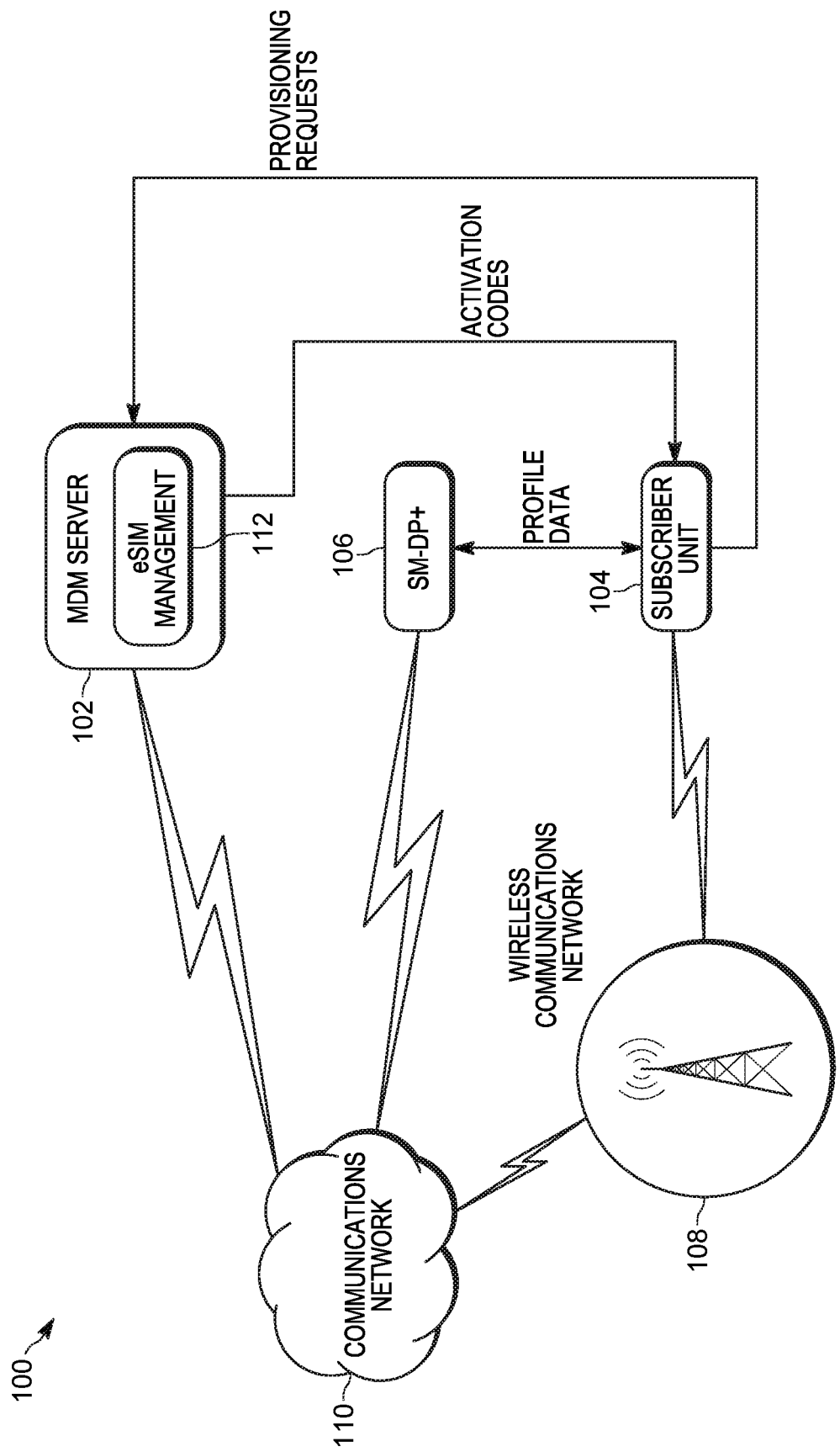
FIG. 1 is a diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, embedded subscriber identity modules (eSIMs), also known as embedded universal integrated circuit cards (eUICCs), store carrier and subscriber profiles. As described herein, the term "subscriber profiles" may refer to both carrier and subscriber profiles. Carrier and subscriber profiles include authentication credentials, carrier information, and other data that enable wireless communication devices to authenticate to and use the services of wireless communications networks. Devices receive their carrier and subscriber profiles through and eSIM provisioning process. Provisioning can take different forms. Some eUICCs are pre-configured, while others include blank profiles, which must be loaded with subscriber profiles by network operators before the devices using the eUICCs can attach to a network. eUICCs are loaded with subscriber profiles using a pull model (also known as the local profile assistant, or LPA, model) or a push model (also known as the machine to machine, or M2M, model).

In the pull model, which is typically used for consumer devices (for example, smart telephones), a user of the device requests the profile download. For example, an operator provided QR (Quick Response) code may be used. The QR code contains the address of the remote provisioning system (for example, an SM-DP+(subscription manager-data preparation) server within the GSMA specifications), which allows the device to connect to that system and securely download a profile. Once the Profile is installed and activated, the device is able to connect to that operator's network.

In the push model, which is typically used for enterprise devices (for example, routers, terminals, and other network equipment), a network operator controls when and how profiles are sent to the devices. For example, backend computer systems may select profiles for automatic download to devices from an SM-SR (subscription manager-secure routing) server.

Some networks, for example, public safety networks, include mixes of both consumer and enterprise devices. Some devices may lack cameras or displays, or may otherwise not be capable of participating in the pull model, thereby requiring a mix of provisioning systems. Operating multiple provisioning systems to control access to a single network results in wasted computing resources and causes a technical problem by increasing data traffic and slowing down the network.

To address these problems, systems and methods are provided herein for, among other things, device agnostic remote eSIM provisioning. Among other things, embodiments provided herein allow both consumer and enterprise devices to operate using a pull model to provision eUICCs in the devices. As described herein, a wireless communication device using an eSIM Mapper application is able to request an activation code, which the device can use to perform a pull model provisioning request. Using such embodiments, only one provisioning system is required for provisioning all network devices, which streamlines and simplifies the provisioning process. Such embodiments provide for more efficient use of communications infrastructure by reducing the time, bandwidth, and computing resources necessary to provision subscriber units.

One example embodiment provides a wireless communication device. The device includes a transceiver, an integrated circuit card, and an electronic processor communicatively coupled to the transceiver and the integrated circuit card. The electronic processor is configured to detect a provisioning trigger event. The electronic processor is configured to, responsive to detecting the provisioning trigger event, transmit, via the transceiver, a provisioning request to a mobile device management server, the provisioning request including a device identifier and an identifier for the integrated circuit card. The electronic processor is configured to receive, from the mobile device management server, an activation code. The electronic processor is configured to transmit, to the integrated circuit card, a provisioning command based on the activation code.

Another example embodiment provides a method for device agnostic remote eSIM provisioning. The method includes detecting, with an electronic processor, a provisioning trigger event. The method includes, responsive to detecting the provisioning trigger event, transmitting, via a transceiver, a provisioning request to a mobile device management server, the provisioning request including a device identifier and an identifier for an integrated circuit card of the wireless communication device. The method includes receiving, from the mobile device management server, an activation code. The method includes transmitting, to the integrated circuit card, a provisioning command based on the activation code.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of one embodiment of a communication system 100, which is configured to, among other things, perform device agnostic remote eSIM provisioning for wireless electronic devices. FIG. 1 shows one example of a networked configuration, in which embodiments may be implemented; other configurations are possible. In the example illustrated, the system 100 includes an MDM (mobile device management server) 102, a subscriber unit 104, an SM-DP+(subscription manager-data preparation) entity 106, and a wireless communications network 108. It should be understood that the system 100 is provided as an example and, in some embodiments, the system 100 includes additional components. For example, the system 100 may include MDM servers, multiple SM-DP+ entities, or combinations thereof. In particular, it should be understood that although FIG. 1 illustrates a single subscriber unit 104, the system 100 may include tens, hundreds, or thousands of subscriber units.

In addition, although the other components of the system 100 are illustrated as communicating with the subscriber unit 104 via a single wireless communications network 108, the subscriber unit 104 (and additional subscriber units) may attach to and communicate via multiple communication networks (constructed in accordance with various network protocols) and connections (for example, wired or wireless connections). Further, although the system 100 is shown as a centralized system, the system 100 may also be implemented as a decentralized system in which the functionality of the MDM server 102 and the SM-DP+ entity 106 is accomplished within other network infrastructure (not shown).

The MDM server 102, the subscriber unit 104, the SM-DP+ entity 106, and the wireless communications network 108 are communicatively coupled to one another via a communications network 110. The communications network 110 is a communications network including wireless connections, wired connections, or combinations of both. The communications network 110 may be implemented using a local area network, for example, a Bluetooth™ network or Wi-Fi, a Long Term Evolution (LTE) network, a wide area network, for example, the Internet, a Global System for Mobile Communications (or Groupe Special Mobile (GSM)) network, a Code Division Multiple Access (CDMA) network, an Evolution-Data Optimized (EV-DO) network, an Enhanced Data Rates for Global Evolution (EDGE) network, a 3G network, a 4G network, 5G network, and combinations or derivatives thereof.

The MDM server 102 is a network-attached computing device, which performs Mobile Device Management (MDM) functions for the subscriber units (including the subscriber unit 104) of the wireless communications network 108). In some embodiments, the MDM server 102 is a computer server that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. In one example, the electronic processor is configured to retrieve instructions and data from the memory and execute, for example, mobile device management functions as described herein. Mobile device management functions include securing, monitoring, and managing applications on subscriber unit of the wireless communications network 108. The MDM server 102 sends and receives data over the communications network 110 using the network interface. In alternative embodiments, the MDM server 102 may be part of a cloud-based computing system external to the system 100 and accessible by the other components of the system 100 over one or more wired or wireless networks.

As illustrated in FIG. 1, the MDM server 102 includes an eSIM management application 112. The eSIM management application 112 stores, processes, sends, and receives device identifiers (for example, each uniquely identifying subscriber units of the wireless communications network 108), embedded universal integrated circuit card identifiers (for example, each uniquely identifying eUICCs embedded in subscriber units of the wireless communications network 108), authentication codes, confirmation codes, and the like. As described herein, the eSIM management application 112 receives provisioning requests from subscriber units (for example, the subscriber unit 104) and transmits activation codes to the subscriber units.

Figure 2:
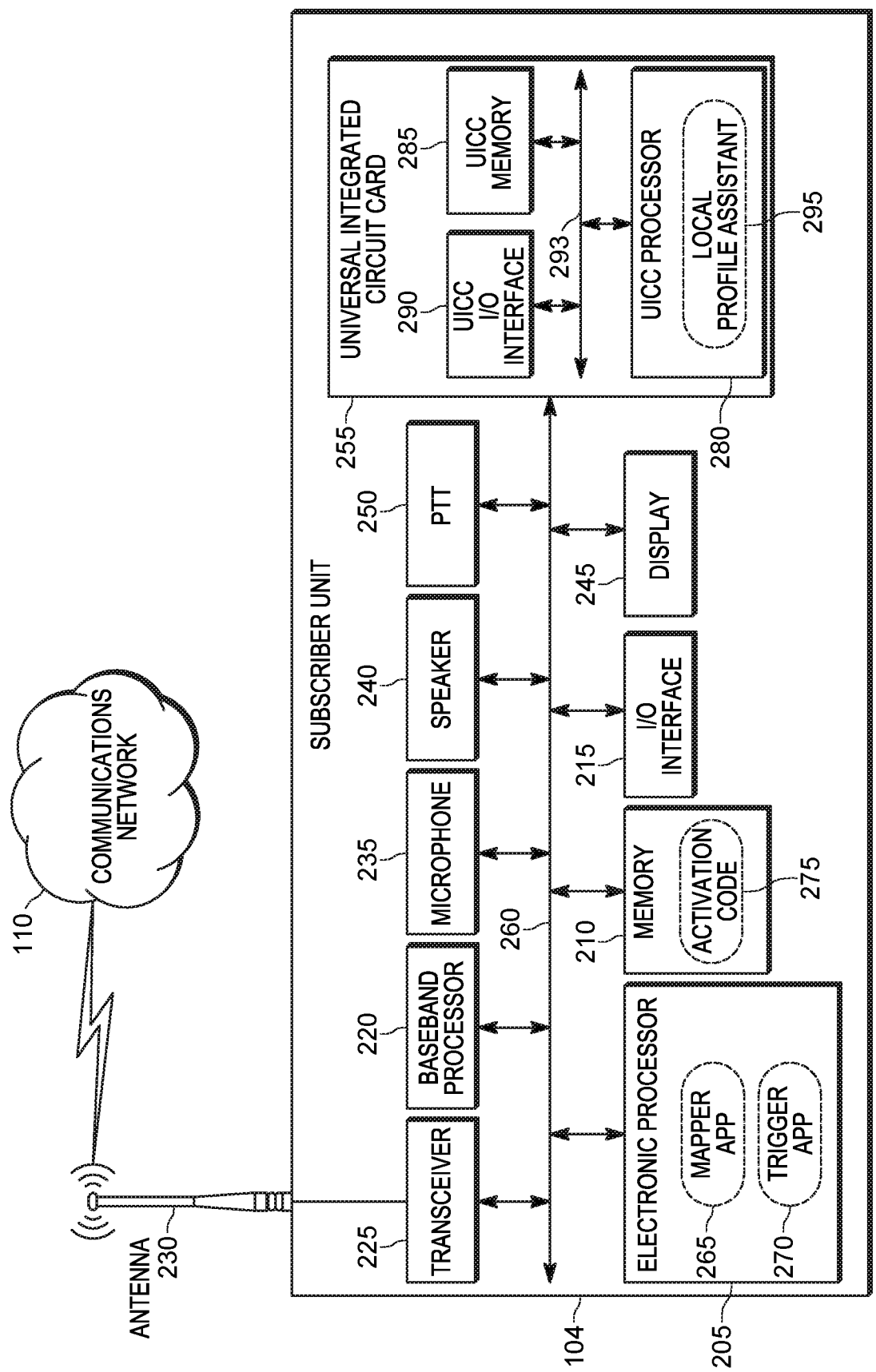
FIG. 2 is a block diagram of a subscriber unit of the system of FIG. 1 in accordance with some embodiments.

The subscriber unit 104, described more particularly with respect to FIG. 2, is one example of many subscriber units, which attach to and communicate via the wireless communications network 108. As used herein, the term "subscriber units" refers to portable wireless communications devices, which include hardware and software configured to communicate via the wireless communications network 108. Subscriber units may be, for example, smart telephones, mobile two-way radios, smart watches, laptop computers, tablet computers, or other similar devices capable of operating as described herein.

The subscriber unit 104 interacts with the wireless communications network 108 (and applications and services provided thereon) according to a subscription profile. A subscription profile includes credentials, parameters, and settings that the subscriber unit 104 uses to establish a connection with the wireless communications network 108. For example, the subscription profile may include a shared symmetric key unique to the subscriber unit 104 and the wireless communications network 108, a public land mobile network identification (PLMN) ID, an international subscriber module identity (IMSI), a shared symmetric key, and operator authentication keys (OPc). The subscriber profile may also include temporary user certificates or temporary identity tokens that allow the subscriber unit 104 to access services and software applications over the wireless communications network 108. As described herein, the subscriber unit 104 utilizes the activation codes provided by the eSIM management application 112 to retrieve profile data, including a subscription profile, from the SM-DP+ entity 106.

In FIG. 1, the SM-DP+ entity 106 represents the hardware, software, and telecommunications infrastructure used to provide, among other things, subscriber profiles to subscriber units of the wireless communications network 108. In some embodiments, the SM-DP+ entity 106 is part of the network infrastructure of the wireless communications network 108. The SM-DP+ entity 106 operates to provide subscription manager data preparation and secure routing functions for the wireless communications network 108.

The wireless communications network 108 may operate according to an industry standard cellular protocol, for example, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which, among other things, an open mobile alliance (OMA) push to talk (PTT) over cellular (OMA-PoC), a voice over IP (VoIP), or a PTT over IP (PoIP) application may be implemented.

FIG. 2 illustrates an example of the subscriber unit 104 in more detail. In some of the embodiments described herein, the subscriber unit 104 is a smart telephone. However, in alternative embodiments, the subscriber unit 104 may be a cellular telephone, a smart watch, a tablet computer, a personal digital assistant (PDA), a portable radio, a converged device, or other device that includes or is capable of being coupled to a network modem or components to enable wireless network communications (such as an amplifier, antenna, etc.) on cellular, land mobile, or other wireless communications networks.

In the embodiment illustrated, the subscriber unit 104 is a wireless communications device, which includes an electronic processor 205, a memory 210, an input/output interface 215, a baseband processor 220, a transceiver 225, an antenna 230, microphone 235, a loudspeaker 240, a display 245, a push-to-talk (PTT) selection mechanism 250, and an embedded universal integrated circuit card 255. The illustrated components, along with other various modules and components are coupled to each other by or through one or more control and/or data buses that enable communication therebetween (for example, a communication bus 260). In some embodiments, the subscriber unit 104 includes fewer or additional components in configurations different from that illustrated in FIG. 2. For example, in some embodiments, the subscriber unit 104 includes a camera, another suitable imaging device, or combinations of both. In some embodiments, the subscriber unit 104 lacks a display 245.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. For example, in the embodiment illustrated, the electronic processor 205 executes, among other things, a mapper application 265 and a trigger application 270 (each described in detail herein with respect to FIG. 3).

The memory 210 can include one or more non-transitory computer-readable media and includes a program storage area and a data storage area. The program storage area and the data storage area can include combinations of different types of memory, as described herein. In the embodiment illustrated, the memory 210 stores, among other things, an activation code (described in detail herein).

The input/output interface 215 is configured to receive input and to provide system output. The input/output interface 215 obtains information and signals from, and provides information and signals to, (for example, over one or more wired and/or wireless connections) devices both internal and external to the subscriber unit 104.

The electronic processor 205 is configured to control the baseband processor 220 and the transceiver 225 to transmit and receive radio frequency signals (for example, encoded with audio) to and from the subscriber unit 104. The baseband processor 220 encodes and decodes digital data (including digitized audio signals) sent and received by the transceiver 225. The transceiver 225 transmits and receives radio signals to and from, for example, the network 120 using the antenna 230. The electronic processor 205, the baseband processor 220, and the transceiver 225 may include various digital and analog components (for example, digital signal processors, high band filters, low band filters, and the like), which for brevity are not described herein and which may be implemented in hardware, software, or a combination of both. In some embodiments, the transceiver 225 includes a combined transmitter-receiver component. In other embodiments, the transceiver 225 includes separate transmitter and receiver components.

The microphone 235 is a transducer capable of sensing sound, converting the sound to electrical signals, and transmitting the electrical signals to the electronic processor 205. The electronic processor 205 processes the electrical signals received from the microphone 235 to produce an audio signal, which may be transmitted to other devices via the transceiver 225. The loudspeaker 240 is a transducer for reproducing sound from electrical signals (for example, generated from a received audio signal) received from the electronic processor 205. The microphone 235 and the loudspeaker 240 support both audible and inaudible frequencies. In some embodiments, the microphone 235, the loudspeaker 240, or both may be integrated in a single housing with the other components (for example, in a portable hand-held radio). In some embodiments, the microphone 235, the loudspeaker 240, or both are present in an accessory device (for example, a remote speaker microphone (RSM)) connect via a wired or wireless connection to the first communication device 105.

The display 245 is a suitable display, for example, a liquid crystal display (LCD) touch screen, or an organic light-emitting diode (OLED) touch screen. In some embodiments, the subscriber unit 104 implements a graphical user interface (GUI) (for example, generated by the electronic processor 205, from instructions and data stored in the memory 210, and presented on the display 245), that enables a user to interact with the subscriber unit 104.

The push-to-talk selection mechanism 250 allows a user of the f subscriber unit 104 to initiate push-to-talk half-duplex voice communications to one or more other communication devices, either directly or over the wireless communications network 108. For example, when the electronic processor 205 detects that the push-to-talk selection mechanism 250 is enabled, the electronic processor 205 controls the transceiver 225 to transmit signals created by sound detected by the microphone 235 (for example, as a half-duplex communication signal). When the electronic processor 205 detects that the push-to-talk selection mechanism 250 is no longer enabled (for example, has been released), the transceiver 225 stops transmitting the signals. In some embodiments, the push-to-talk selection mechanism 250 is a mechanical button, key, switch, or knob. In some embodiments, the push-to-talk selection mechanism 250 is provided as part of a graphical user interface (for example, a virtual button) presented on the display 245.

The embedded universal integrated circuit card (eUICC) 255 is a self-contained computer on a chip and includes a UICC processor 280, a UICC memory 285, and a UICC input/output interface 290. The UICC processor 280, the UICC memory 285, and the UICC input/output interface 290, as well as other various modules and components, are connected by one or more control or data buses to enable communication between the modules and components (for example, a communication bus 260). The UICC memory 285 may include a program storage area and a data storage area. The UICC processor 280 is connected to the UICC memory 285 and retrieves and executes computer readable instructions ("software") stored in the UICC memory 285. The software includes, for example, a local profile assistant 295 that includes a set of functions for providing the capability to download subscription profiles to the eUICC 255. The UICC memory 285 may also include various access credentials used by the subscriber unit 104 to communicate using the wireless communications network 108.

The UICC processor 280 communicates, via the UICC input/output interface 290, with other components of the subscriber unit 104 to send and receive data, including, for example, access credentials for the wireless communications network 108.

Figure 3:
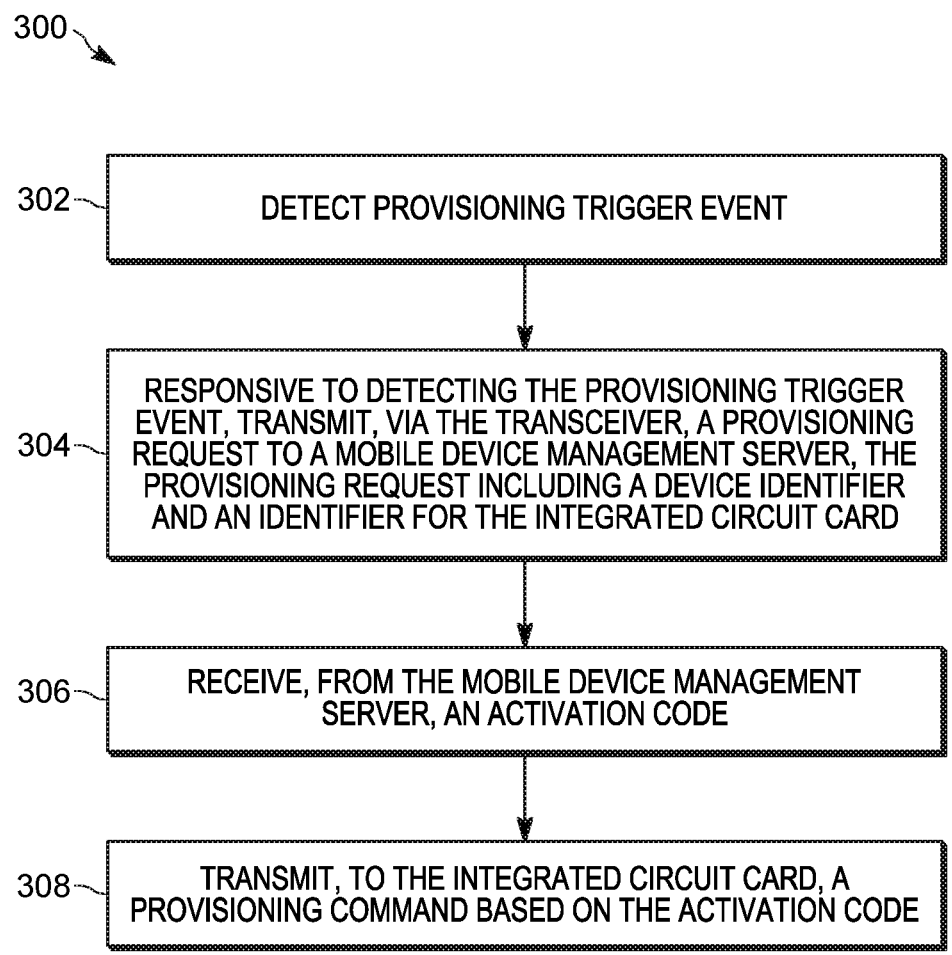
FIG. 3 is a flowchart illustrating a method for operating the system of FIG. 1 in accordance with some embodiments.

FIG. 3 illustrates an example method 300 for operating the system 100 to perform device agnostic remote eSIM provisioning. Although the method 300 is described in conjunction with the system 100 as described herein, the method 300 could be used with other systems and devices. In addition, the method 300 may be modified or performed differently than the specific example provided.

As an example, the method 300 is described as being performed by the subscriber unit 104 and, in particular, the electronic processor 205. However, it should be understood that in some embodiments, portions of the method 300 may be performed by other devices, including for example, the MDM server 102 and the SM-DP+ entity 106. Additional electronic processors may also be included in the subscriber unit 104 and the MDM server 102 that perform all or a portion of the method 300. For ease of description, the method 300 is described in terms of the single subscriber unit 104 attached to the wireless communications network 108. However, the method 300 may be applied to hundreds or thousands of devices operating across multiple networks. Similarly, the method 300 may be applied to devices that include more than one eSIM. Though the steps in FIG. 3 are shown in a particular order, many of the steps may be performed in an arbitrary order, and many different implementations are possible.

At block 302, the electronic processor 205 detects a provisioning trigger event. A provisioning trigger event is an electronic message, flag, interrupt, or other indication that the subscriber unit should initiate the provisioning process. In some embodiments, the electronic processor 205 detects the provisioning trigger based on an input received from a human machine interface (for example, the display 245 or another device input mechanism) of the subscriber unit 104. For example, a user may trigger the provisioning by selecting a control presented on a graphical user interface of the device. In another example, a user may trigger provisioning by inputting a particular sequence on a physical or virtual keypad.

In some embodiments, electronic processor 205 may execute the trigger application 270 and detect the provisioning trigger event using the trigger application 270. In some embodiments, the electronic processor 205 detects the provisioning trigger event by receiving an electronic request via an application programming interface. For example, an operating system or other software process (such as a bootup procedure) of the subscriber unit 104 may periodically trigger the provisioning process by sending an electronic command to the trigger application 270. In some embodiments, the trigger application receives an electronic command from outside the subscriber unit (for example, from the MDM server 102), which triggers the subscriber unit to initiate the provisioning process. In some embodiments, the trigger application 270 monitors a human machine interface or other components of the subscriber unit 104 to detect the provisioning trigger event.

Regardless of how the provisioning trigger event is detected, at block 304, the electronic processor 205, responsive to detecting the provisioning trigger event, transmits (for example, via the transceiver 225) a provisioning request to the mobile device management server 102. The provisioning request includes a device identifier and an identifier for the eUICC 255. In some embodiments, the device identifier is a unique alphanumeric code that identifies the subscriber unit. Likewise, the identifier for the eUICC uniquely identifies the eUICC.

In some embodiments, the electronic processor 205 responsive to detecting the provisioning trigger event, causes the trigger application 270 to provide to the mapper application 265 a resource locator for the mobile device management server (for example, a fully qualified domain name or other suitable network address for the MDM server 102) and the provisioning request. The electronic processor 205 then transmits, using the mapper application 265, the provisioning request to the MDM server 102 based on the resource locator for the MDM server 102.

In some embodiments, the resource locator for the MDM server 102 is embedded in the mapper application.

In some embodiments, responsive to receiving the resource locator for the MDM server 102 and the provisioning request, the electronic processor 205 validates the provisioning request prior to transmitting it to the MDM server 102. For example, the provisioning request may have an embedded checksum, a hash, or some other means of validating the request. In other embodiments, the provisioning request, the resource locator, or both, are encrypted (for example, using public-key encryption) and must be successfully decrypted in order to be considered valid.

Responsive to validating the provisioning request, the electronic processor 205 transmits the provisioning request to the MDM server 102. The MDM server 102 stores (for example, in a database) activation codes and device and eUICC identifiers. In response to receiving a provisioning request, the MDM server 102 transmits the activation code matching those identifiers to the requesting subscriber unit.

At block 306, the electronic processor 205 receives, from the mobile device management server, the activation code. The activation code includes a resource locator and an authentication key, and may include other parameters (for example, acceptable time windows for making provisioning requests, backup resource locators, and other parameters relevant to subscriber unit provisioning). The resource locator is a fully qualified domain name or another suitable network address for the SM-DP+ entity 106. In some embodiments, the authentication key is a shared symmetric key used to authenticate the subscriber unit to the SM-DP+ entity 106. Other suitable authentication means may be used.

At block 308, the electronic processor 205 transmits, to the eUICC 255, a provisioning command based on the activation code. For example, the mapper application 265 sends an electronic command to the local profile assistant 295, which in turn retrieves the profile data for the subscriber unit 104 (for example, the subscriber profile) from the SM-DP+ entity 106 based on the activation code. For example, the local profile assistant 295 sends the authentication key to the SM-DP+ entity 106 using the resource locator.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:
1. A communications system for device agnostic remote provisioning, the system comprising:
a communications network;
a plurality of consumer subscriber devices, each of the plurality of consumer subscriber devices configured to be provisioned using a default pull model;
a plurality of enterprise subscriber devices, each of the plurality of enterprise subscriber devices configured to be provisioned using a default push model wherein at least one of the plurality of enterprise subscriber devices lacks a user interface; and
a single remote embedded subscriber identity module (eSIM) provisioning system including a mobile device management server configured to manage the plurality of consumer subscriber devices and the plurality of enterprise subscriber devices;
wherein the at least one enterprise subscriber device lacking the user interface includes an embedded universal integrated circuit card (eUICC) and an eSIM mapper application configured to automatically request an activation code from the mobile device management server; and
wherein the activation code enables the eUICC to periodically provision, using a pull model rather than a default push model, the at least one enterprise subscriber device with a profile for connecting to the communications network.

2. The communications system of claim 1, wherein the at least one enterprise subscriber device lacking the user interface includes neither a camera nor a display.

3. The communications system of claim 1, wherein the eUICC periodically provisions the at least one enterprise subscriber device with the profile for connecting to the communications network by executing a trigger application residing outside of the eUICC to detect a provisioning trigger event, wherein detecting the provisioning trigger event does not include detecting a user input.

4. The communications system of claim 3, wherein,
 responsive to detecting the provisioning trigger event, the
  trigger application provides to the eSIM mapper application a resource locator for a mobile device management server and a provisioning request; and
 the eSIM mapper application transmits the provisioning request to the mobile device management server, the provisioning request including a device identifier and an identifier for the eUICC.

5. The communications system of claim 4, wherein,
 the mobile device management server is configured to, responsive to receiving the provisioning request, provision the at least one enterprise subscriber device as if the at least one enterprise subscriber device were configured to operate using the pull model rather than the default push model.

\* \* \* \* \*